No. 723,451. PATENTED MAR. 24, 1903.
J. B. ENTZ.
STORAGE BATTERY.
APPLICATION FILED AUG. 28, 1900.
NO MODEL.
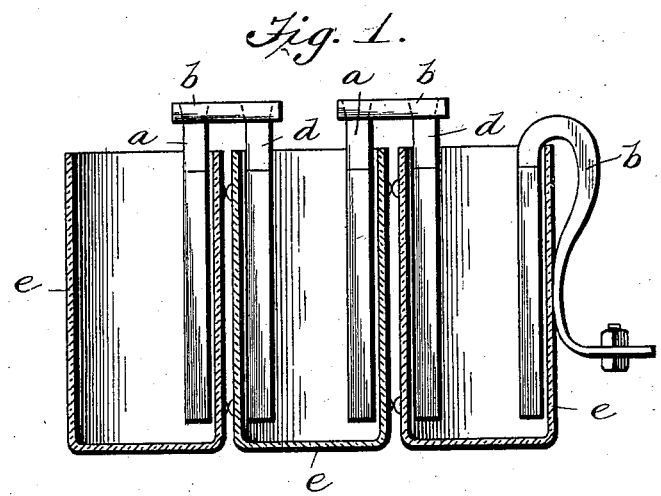
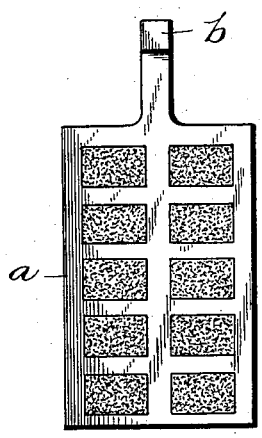
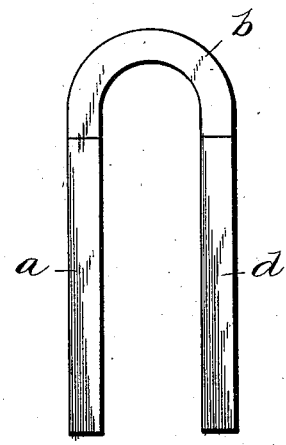
Witnesses
E. W. Hart
Jas. A. Richmond
Inventor
Justus B. Entz
Augustus B. Stoughton
By
Attorney

UNITED STATES PATENT OFFICE.

JUSTUS B. ENTZ, OF PHILADELPHIA, PENNSYLVANIA, ASSIGNOR TO ELECTRIC STORAGE BATTERY COMPANY, OF PHILADELPHIA, PENNSYLVANIA, A CORPORATION OF NEW JERSEY.

STORAGE BATTERY.

SPECIFICATION forming part of Letters Patent No. 723,451, dated March 24, 1903.

Application filed August 28, 1900. Serial No. 28,344. (No model.)

*To all whom it may concern:*

Be it known that I, JUSTUS B. ENTZ, a citizen of the United States, residing at the city of Philadelphia, in the county of Philadelphia and State of Pennsylvania, have invented certain new and useful Improvements in Storage Batteries, of which the following is a specification.

The object of my invention is to provide a new article of manufacture in the shape of a storage-battery element, same consisting of a plate having a hook-like terminal that extends opposite the face of the plate and in conjunction with the wall of the containing-jar serves the double function of a separator and connector.

The nature, characteristic features, and scope of the invention will be more readily understood from the following description, taken in connection with the accompanying drawings, forming a part hereof, and in which—

Figure 1 is a cross-section through a battery of cells, showing the application of my invention. Fig. 2 is a face view of a positive and negative plate united to form a single element after the manner of my invention, and Fig. 3 is a modified form thereof.

In practicing my invention use is made of a unit element comprising a positive plate $a$ and a negative plate $d$, arranged face to face and apart, and of a yoke $b$, connecting said plates and holding them in such position. This yoke $b$ is arranged crosswise of the faces of the plate, and it is generally U-shaped and constitutes a conductor. It may be of the form shown in Figs. 1 and 2 or of the form shown in Fig. 3, and at the end cell it may be arranged in hook-like form, as shown at the right-hand side of Fig. 1, where it binds upon the wall of the jar or cell.

$e$ represents jars each of which receives one plate of each unit element, and the side walls of the jars operate as separators.

The plates can be mounted with great facility, and the expenditure of time and labor heretofore required in connecting up the batteries is obviated, it being understood that the positive and negative plates may be connected with their yokes and shipped ready for installation by the simple operation of placing them in the jars, as described. The multiplicity of separators heretofore employed is dispensed with, and the walls of the jars serve to keep the plates apart. Moreover, worn-out plates may be readily removed and replaced by simply lifting out the connected couple or unit element and replacing it by another.

It will be obvious to those skilled in the art to which the invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

The combination with a compartment of a plate having a hook-like terminal that extends opposite the face of the plate whereby the wall of the compartment is clamped between the bill of the hook and the face of the plate so that the latter is held to place in respect to the walls, substantially as described.

In testimony whereof I have hereunto signed my name.

JUSTUS B. ENTZ.

In presence of—
W. J. JACKSON,
K. M. GILLIGAN.